United States Patent [19]

Venkataramanan

[11] Patent Number: 5,602,725
[45] Date of Patent: Feb. 11, 1997

[54] SPECIAL PURPOSE POWER CONTROL DEVICES USING 3-PHASE PWM CONVERTERS FOR THREE PHASE AC POWER

[75] Inventor: Giri Venkataramanan, Bozeman, Mont.

[73] Assignee: The Research and Development Institute at Montana State University, Bozeman, Mont.

[21] Appl. No.: 309,355

[22] Filed: Sep. 21, 1994

[51] Int. Cl.$^6$ .................................................. H02M 5/45
[52] U.S. Cl. ............................................. 363/37; 363/34
[58] Field of Search ................................. 363/34, 36, 37, 363/123, 125, 127, 132

[56] References Cited

U.S. PATENT DOCUMENTS

| | | | |
|---|---|---|---|
| 4,521,671 | 6/1985 | Fronius | 219/130.31 |
| 4,697,230 | 9/1987 | Neft | 363/136 |
| 4,894,763 | 1/1990 | Ngo | 363/35 |
| 4,947,308 | 8/1990 | Gulczynski | 363/37 |
| 5,017,800 | 5/1991 | Divan | 363/37 |
| 5,099,410 | 3/1992 | Divan | 363/132 |

Primary Examiner—Matthew V. Nguyen
Attorney, Agent, or Firm—Lowe, Price, LeBlanc & Becker

[57] ABSTRACT

A special purpose custom power control apparatus outputs AC power having one or more particular characteristics relative to the AC power input thereto. Duty ratio of operation of GTO devices is controlled to transform the input power to the output power having its particular characteristics. In one embodiment duty ratio variation is used to provide a continuously variable transformation ratio from input to output. In another embodiment, duty ratio variation is used for controlling relative amounts of power drawn from different input buses, thus permitting isolation of faults and redirecting power flow. Another embodiment uses variation of GTO duty ratio to provide a continuously variable phase shift for each phase of a multi-phase distribution line. In another embodiment, duty ratio is modulated inversely to a voltage balance and a buck converter has a transfer ratio which is directly proportional to the duty ratio, to eliminate voltage unbalance on the multi-phase input AC. In still another embodiment, the duty ratio is modulated inversely to harmonics on the line, to increase and decrease magnitude of at least one phase inversely to the harmonics and to eliminate the harmonics.

8 Claims, 3 Drawing Sheets

SPECIAL PURPOSE POWER CONTROL DEVICES USING 3-PHASE PWM CONVERTERS FOR THREE PHASE AC POWER

TECHNICAL FIELD

This invention relates generally to power converters, and more particularly to special purpose applications of a family of three-phase PWM power converters disclosed in a pending related patent application entitled "PWM Converters for Three Phase AC Power Control and AC to DC Conversion" Ser. No. 08/309,356 filed concurrently herewith on Sep. 21, 1995 by the inventor hereof. To the extent not described herein, the subject matter and disclosure of the related application is incorporated herein by reference.

BACKGROUND ART

Increasing use of loads supplied by electronic power converters in industry has led to growing problems with the reliability of the power supply. Computers, adjustable speed drives, and automated manufacturing processes are very sensitive to voltage sags and brief outages. The need for greater power quality has prompted the use of uninterruptable power systems and/or other electronic power conditioning means to maintain the voltages within the susceptibility levels of the critical equipment. Nonetheless, the prior art has not been able to raise the power quality levels to meet these requirements. However, a new family of power converters developed by the present inventor and described in the aforementioned copending application permits improvement of power quality levels to meet the greater challenges posed by the above noted problems.

Historically, thyristor controlled equipment, such as the High Voltage Direct Current (HVDC) transmission systems and Static VAR Compensators (SVC), have been used extensively in power system applications. However, the use of gate turn-off devices in power systems has not been viable until recent progress in semiconductor devices. The use of the Static Condenser (STATCON) and the Unified Power Flow Controller (UFC) to realize power flow control in transmission systems was proposed as high performance alternatives to conventional thyristor based Static VAR Compensators by Gyugyi, in "A Unified Power Flow Control Concept for Flexible AC Transmission Systems", IEE 5th International Conference on AC and DC Transmission, 1991, London. Development activities related to these devices have thyristor based Static VAR Compensators. However, development activities related to these devices have primarily focused towards control of power flow at the transmission level under the Flexible AC Transmission Systems (FACTS) program.

The use of gate turn-off device technology to realize control at the distribution level was proposed under the framework of the Custom Power program initiated by the electric Power Research Institute (EPRI), in "Recent Development: EPRI's Custom Power Concept", H. Mehta, Proceedings of Power Quality '93 Conference, Intertec International Inc., Ventura, Calif., pp. 794–795, October, 1993.

The concept of Custom Power introduces a supply-side alternative to consumer installed uninterruptable and standby power systems. Custom Power meets the critical power needs of the customer and provides large energy users with reliable electric power with built-in redundancies and fault tolerances and higher efficiency. This approach is expected to yield major energy savings resulting from the elimination of energy storage and retrieval stages. STATCONs and solid state breakers have been proposed to provide a more reliable supply in such cases.

DISCLOSURE OF INVENTION

It is accordingly an object of the present invention to provide power supplies having improved reliability.

It is a more particular object of the invention to provide improved reliability custom power sources as configurations of high performance, PWM, three phase AC power converters.

Still more specifically, it is an object of the present invention to provide a new family of control devices for Custom Power applications with a significantly increased scope for enhancing the quality of power provided to the customer in a wide variety of conditions.

It is a more particular object of the invention to provide converters having the ability to regulate voltage at a bus during voltage sags and in over-voltage conditions, as well as to perform still other functions.

The invention thus provides a new family of improved reliability custom power sources, as configurations of high performance, PWM, three phase AC power converters, with the ability to regulate voltage at a bus during voltage sags and in over-voltage conditions, as well as to perform still other functions for Custom Power applications.

The foregoing and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawings and the descriptions provided herein are to be regarded as illustrative in nature and not as restrictive of the invention.

BRIEF DESCRIPTION OF THE DRAWING

The accompanying drawings, incorporated into and forming a part of the specification, illustrate several aspects of a preferred embodiment of the present invention and, together with the description, serve to explain the principles of the invention. In the drawings.

BEST MODE FOR CARRYING OUT THE INVENTION

The present invention provides a novel and unobvious improvement in power control, using PWM three phase AC-AC converters of the types disclosed in the copending related patent application of the present inventor.

A family of three phase ac-ac power converters operating on the principle of pulse width modulation is described in the copending application. Each of these converters has its own characteristic operating features. Table 1 lists various features of these converters which are important from a power control point of view.

TABLE 1

Properties of ac—ac power converters

| CONVERTER | TRANSFER RATIO |
| --- | --- |
| BUCK | D |
| BOOST | 1/(1-D) |
| BUCK-BOOST | D/(1-D) |
| FLYBACK | nD/(1-D) |
| CUK | D/(1-D) |
| ISOLATED CUK | nD/(1-D) |

The voltage transfer ratio of these converters provides information on the performance of the converter as a voltage regulator. The input impedance of the converters determine the VAR consumption characteristics when the converters are used as electronic impedances. The application of these converters to realize various power control functions is the subject of the present application, and is described as follows.

Figure 1:
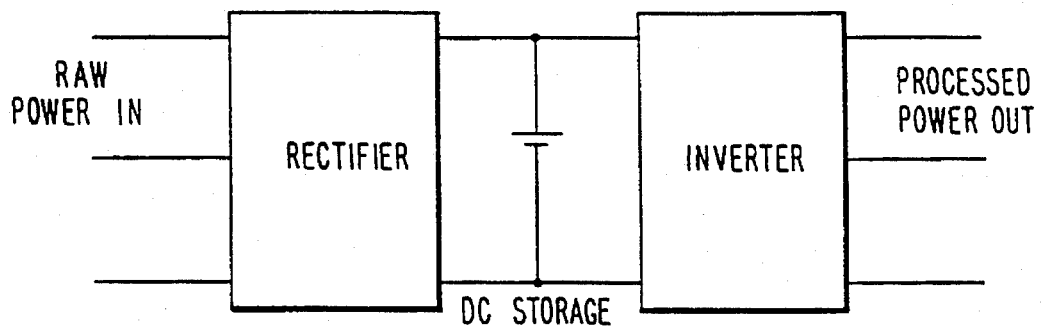
FIG. 1 shows a prior art UPS.

The concept of Custom Power was proposed as a utility side solution for providing high quality electric power to industrial and commercial customers. The current practice of using Uninterruptable Power Supplies (UPS) to provide a high quality power supply, as illustrated in FIG. 1, becomes unfeasible as the power level increases. UPS operation involves rectifying the ac power from the utility to DC, and then inverting it back to AC for the load. An energy storage device is added on the DC side of such known devices to provide an ability to ride-through brief outages, with a backup generator added to provide power during longer outages. The use of multiple power conversion stages decreases the overall efficiency of the converter.

Figure 2:
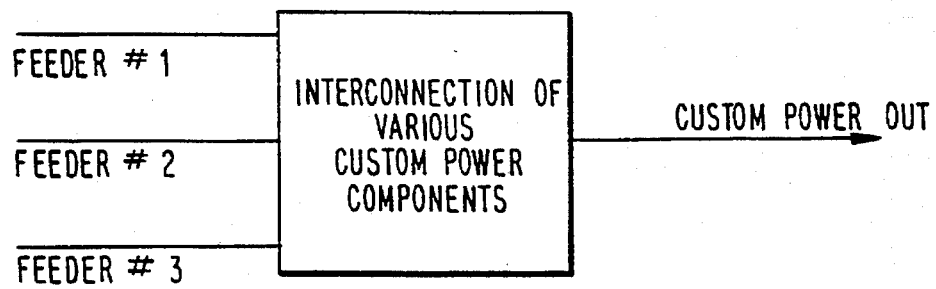
FIG. 2 shows a Custom Power utilization of power converters on a utility distribution system.

Custom Power utilizes power converters on the utility distribution system, as shown in FIG. 2. The use of multiple feeders to provide the power supply eliminates the need for local storage, thereby reducing the need for additional power conversion stages. The decrease in power conversion stages immediately translates to a potential for higher overall system efficiencies. Moreover, power conversion at higher voltage levels improves the conversion efficiency.

However, the previously proposed Custom Power devices include a solid-state breakers (SSB), Static Condensers (STATCONs), and dynamic voltage restorers. A system with multiple feeders is used in conjunction with a static transfer switch for isolating faults and redirecting the power flow has been shown to eliminate the need for local storage.

The PWM AC-AC power converter combines positive aspects of the SSB with those of STATCON (other than energy storage), and adds additional functions not present in these converters. This functionality can be built into a single package which can be mass produced and placed in many locations within the distribution system. The basic converter topologies are disclosed in the pending patent application and in the inventor's coauthored paper, "Versatile PWM Converters for Three Phase AC Power Conditioning", Srinivasan and Venkataramanan, presented at PCIM/Power Quality 1994.

In accordance with the invention, a wide a scenario of applications of PWM ac-ac power converters is available in a power distribution system with regard to custom power. The inventive applications include the following.

(a) Voltage regulation

Figure 3:
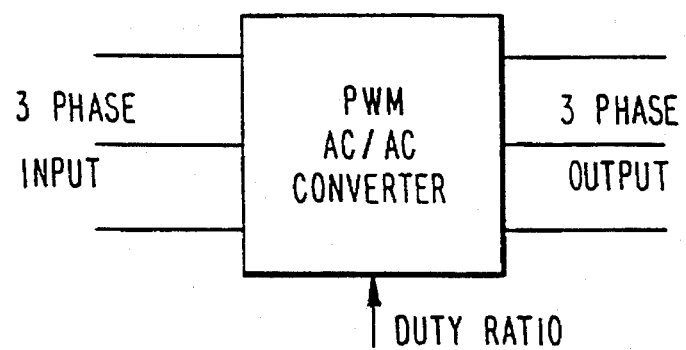
FIG. 3 shows a configuration of PWM converters as tap-changing transformers having a continuously variable transformation ratio in accordance with the invention.

By far, voltage regulation is expected to be the most utilitarian application of the converters. Advantageously, the PWM converters may be operated as conventional tap-changing transformers, but with a continuously variable transformation ratio as shown in FIG. 3. It is a concept of the present invention that such configurations of the converters may also be used in conjunction with conventional transformers in a series connection to provide a specified control range.

Figure 4:
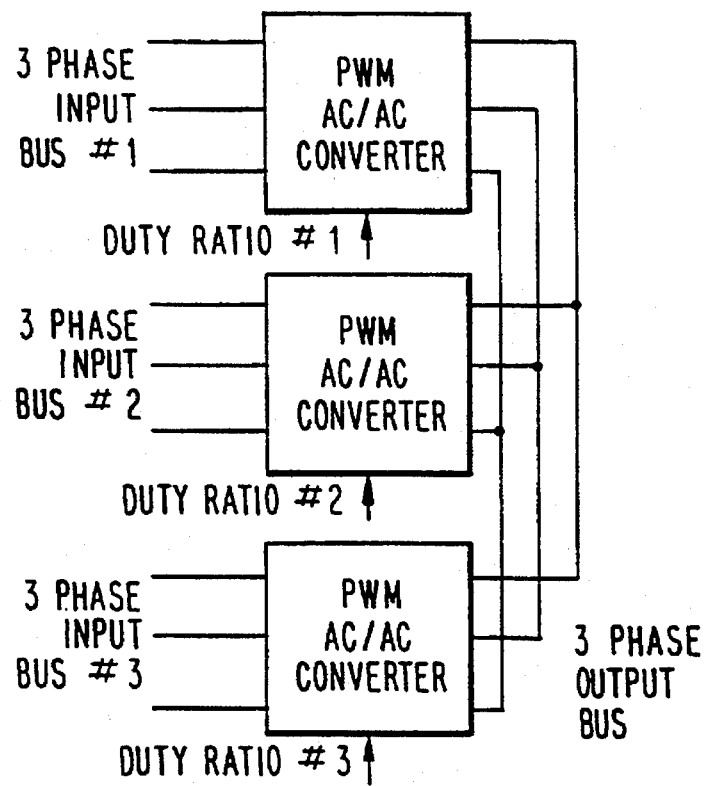
FIG. 4 shows a dynamic cluster, illustrating an interconnection of three feeders in accordance with the invention.

(b) Dynamic cluster:

As another configuration of the PWM converters, there is shown at FIG. 4 an arrangement for integrating two or more buses together at one point, and for controlling the power drawn from each bus. The active and reactive power drawn from each of the incoming buses is controlled under static and dynamic conditions by varying the duty ratio of the corresponding converter. In the case of a power outage on one the buses, the characteristics of the PWM converter permit the power drawn from a different bus to be increased with minimal transients, if any. Since the converters in themselves incorporate gate turn-off switches in each incoming line and phase, power transfer and isolation between buses may be performed with great ease.

Figure 5:
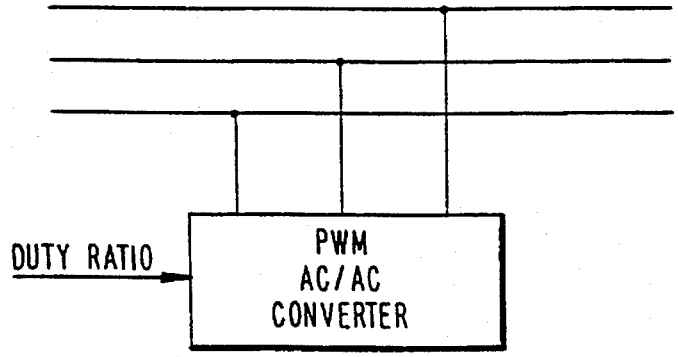
FIG. 5 shows a shunt compensator in accordance with the invention.

(c) Shunt Compensation:

As can be observed from the expressions for the complex impedance of the different converters listed in Table 1, a suitable choice of converter components permits all the different converters to be controlled as a continuously variable source or sink of reactive VAR for a system, by varying the duty ratio D. Such a shunt compensator is illustrated in FIG. 5. The interface to the bus at the point of compensation may also be performed using a parallel connected transformer to enhance operating safety.

As will be appreciated by those of ordinary skill, each of the converters described above has its own characteristic properties and may have a niche of its own, depending on the application.

(d) Series compensation

Figure 6:
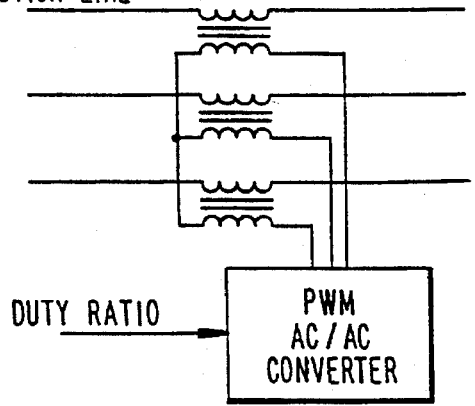
FIG. 6 shows a series compensator using ac-ac power converter in accordance with the invention.

In another configuration in accordance with the invention, the converter may also be inserted in series with a line through a series injection transformer thereby to control the series impedance of the line, as shown in FIG. 6.

e) Phase shift

Figure 7:
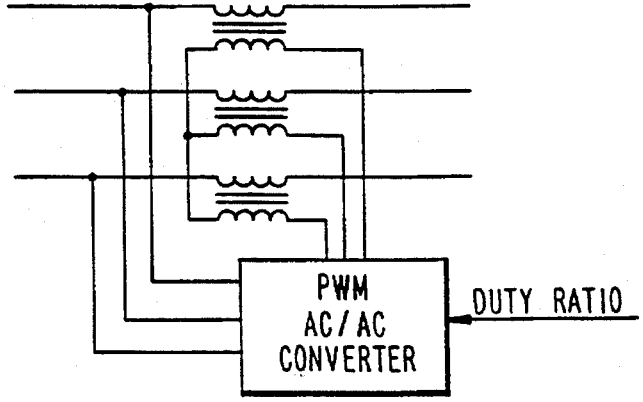
FIG. 7 shows a phase shift configuration achieved by the PWM converter in accordance with the invention.

By staggering the phases of the input and the output at an insertion point in a line, phase shift may be provided just as in conventional phase shift transformer. Such a configuration is shown for the PWM converter in FIG. 7. Advantageously, the converter does not require a separate specially wound transformer to generate the variable phase shift. Moreover, the configuration of FIG. 7 permits continuous variation of the phase shift, instead of just in steps as in the case of conventional and thyristor controlled phase shifters. Control may be performed directly through duty ratio modulation.

(f) Voltage balancing

The converter duty ratio may be modulated to correct any unbalance in the source voltage. As an illustration, if the power source contains 20% negative sequence unbalance, in addition to 100% positive sequence, the source voltage may be written as $$V_{in}=e^{jwt}+0.2\ e^{-jwt} \quad (1)$$

If a buck converter is used to correct the unbalance and if the duty ratio is chosen to be $$D=1/(1+0.2e^{-2jwt}) \quad (2)$$

the output voltage will be $$V_{out}=DV_{in}=e^{jwt} \quad (3)$$

Thus, in the inventive configuration the unbalance is completely absent at the output.

By a similar modulation of the duty ratio, it is possible to completely eliminate any voltage unbalances with the use of the other power converters as well. This may be operated in conjunction with voltage regulation as illustrated in FIG. 3, or in conjunction with a dynamic cluster as illustrated in FIG. 4. Other configurations and embodiments, based on shunt and series compensation methods, are also possible by injecting currents or voltages in only one of the phases in order to correct the unbalance.

(g) Harmonic cancellation

In a similar manner as above, modulation of duty ratio can be used to eliminate voltage harmonics in the supply. For instance, if the source voltage contains 10% 5th harmonic in addition to the fundamental, the supply voltage $$V_{in}=e^{jwt}+0.1\ e^{j5wt} \quad (4)$$

If a buck converter is used to cancel the harmonics and if the duty ratio is chosen to be $$D=1/(1+0.1e^{j4wt}) \quad (5)$$

the output voltage will be $$V_{out}=DV_{in}=e^{jwt} \quad (6)$$

Thus, again, all the harmonics are absent at the output. An additional constraint in range of possible harmonic cancellation and/or voltage balancing is that the instantaneous duty ratio is to stay between zero and unity. As in the voltage balancing operation, this function may be realized in conjunction with other schemes, such as voltage regulation, shunt compensation, etc.

As will be appreciated, use of the above concepts for cancellation of current harmonics is also feasible.

The largest GTO devices commercially available are in the 6 kV –4 kA rating, with 6 kA devices to be available shortly. At present, five 4.5 kV devices connected in a series string appears to be used per switch in 15 kV class systems. Availability of 6 kV devices will allow use of only three devices in series per switch, thereby reducing losses and increasing reliability further. In addition, 9 kV devices at 4 kA devices are expected to be available within the next 2–3 year time frame. This will further reduce the number of devices. Diodes at similar voltage and current levels are also expected to be available concurrently.

IGBT's are expected to be available at about 2.5 kV, 500A range within the next two years. Further increase in voltage capability may not be expected due to device physics limitations. Hence their use may be ruled out, at least as far as applications on the primary side of the transformer. Other thyristor based MOS gated devices at 4.5 kV and above, with current levels of a few kiloamperes, seem to be under development. However, commercial MCT's are only available at 600V-75A at present.

The above data was obtained from one of the leading semiconductor manufacturers. However, devices from other major manufacturers may be expected to follow similar trends. The trends seem to indicate that multi-megawatt gate turn-off power semiconductor technology is already available for exploitation and is expected to show vast improvement over the coming years.

The overall conversion efficiency must be addressed whenever examining power converters for power transmission and distribution applications. Preliminary investigations indicate that, using these converters built using IGBT's to operate on the low voltage side of the distribution transformers, the efficiencies obtainable are better than 99.1%.

It is believed that PWM AC/AC converters will help realize a number of functions necessary for power control at the distribution level. A few advantages this approach Include: use of simple, standard switching modules; extremely simple control techniques; analysis is based on well established, well understood dc-dc converter technology; an absence of a dc bus minimizes supplementary energy storage; small reactive component size; multi-functional capability; wide control range; and lower harmonic interaction.

The foregoing description of the preferred embodiments of the invention has been presented for purposes of illustration and description. It is not intended to be exhaustive or to limit the invention to the precise forms disclosed, since many modifications or variations thereof are possible in light of the above teaching. All such modifications and variations are within the scope of the invention. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

I claim:

1. Apparatus for providing custom power control for multi-phase AC power by transforming at least one characteristic of a multi-phase input AC voltage, comprising:

input terminals for receiving the multi-phase input AC voltage;

output terminals for outputting to a user an output AC voltage having at least one characteristic different from the multi-phase input AC Voltage;

a switching circuit with controllable duty ratio of operation connected to said input terminals for variably switching interconnections among said input terminals and said output terminals thereby to transform said at least one characteristic of the received multi-phase input AC voltage; and a control terminal supplying a control voltage to controllably change the duty-ratio of operation of said switching circuit thereby to transform said multi-phase input AC voltage to said output AC voltage outputted on said output terminals, wherein said switching circuit comprises pulse-width-modulated (PWM) gate-turn-off (GTO) devices for variably increasing and decreasing a magnitude of at least one phase of said multi-phase input AC voltage provided to said output terminals by varying duty ratios of operation thereof in response to said control voltage.

2. The apparatus of claim 1, wherein said GTO devices are connected to each phase of said multi-phase input AC voltage and are responsive to said control voltage for continuously changing a transformation ratio for a voltage magnitude of said each phase to provide a multi-phase output AC voltage having a controllable continuously variable transformation ratio from said multi-phase input AC voltage, wherein said GTO devices are connected to respond to said control voltage by varying said transformation ratio in a continuous range both greater than and less than one.

3. The apparatus of claim 1, comprising:

a plurality of sets of input terminals, each set receiving respective multi-phase input AC power from a respective one of a plurality of multi-phase buses, and a plurality of switching circuits each comprising PWM GTO devices for respectively variably increasing and decreasing a magnitude of at least one phase of said respective multi-phase input AC power from the respective multi-phase bus by varying duty ratios of operation thereof in response to a respective control voltage applied thereto, each of said plurality of switching circuits being connected to a common multi-phase output AC bus, said plurality of switching circuits integrating said plurality of multi-phase buses for increasing and decreasing amounts of power respectively drawn from each bus in response to said respective control voltages thereby isolating faults and redirecting power flow from said plurality of multi-phase buses to said common multi-phase output AC bus.

4. The apparatus of claim 1, wherein said GTO devices are connected to each phase of a multi-phase distribution line for receiving each phase of said multi-phase input AC voltage, and said output terminals are connected by series transformers to each phase of the multi-phase distribution line;

said GTO devices providing a continuously variable phase shift for each phase of the multi-phase distribution line by operating in response to said control voltage for producing at least one output voltage having a continuously changing transformation ratio with respect to at least one voltage, obtained between at least one pair of said input terminals, and applying the at least one output voltage through a corresponding at least one of said series transformers to a corresponding phase of the multi-phase distribution line, thereby continuously changing a phase shift applied to the corresponding phase.

5. The apparatus of claim 1, wherein said GTO devices are responsive to said control voltage for eliminating a voltage unbalance on said multi-phase input AC voltage;

wherein said GTO devices are connected to each phase of said multi-phase input AC voltage and are responsive to said control voltage for continuously changing a transformation ratio for a voltage magnitude of said each phase to provide a multi-phase output AC voltage having a controllable continuously variable transformation ratio from said multi-phase input AC voltage, said control terminal supplying a control voltage having a duty ratio modulated inversely to the voltage unbalance thereby increasing and decreasing a magnitude of at least one phase of said multi-phase input AC voltage inversely to the voltage unbalance to eliminate the voltage unbalance thereof.

6. The apparatus of claim 5, wherein said GTO devices are connected to provide a buck converter having a transfer ratio of output to input voltage directly proportional to said duty ratio, said voltage unbalance being represented for said at least one phase as a sum of the phase voltage thereof and a portion of a phase voltage of another phase, said duty ratio for the GTO devices connected to said at least one phase modulated inversely to the sum of the phase voltage thereof and the portion of the phase voltage of the other phase, thereby eliminating the voltage unbalance of said at least one phase.

7. The apparatus of claim 1, wherein said GTO devices are responsive to said control voltage for eliminating harmonics present on said multi-phase input AC voltage;

wherein said GTO devices are connected to each phase of said multi-phase input AC voltage and are responsive to said control voltage for continuously changing a transformation ratio for a voltage magnitude of said each phase to provide a multi-phase output AC voltage having a controllable continuously variable transformation ratio from said multi-phase input AC voltage, said control terminal supplying a control voltage having a duty ratio modulated inversely to the harmonics thereby increasing and decreasing a magnitude of at least one phase of said multi-phase input AC voltage inversely to the harmonics to eliminate the harmonics present therein.

8. The apparatus of claim 7, wherein said GTO devices are connected to provide a buck converter having a transfer ratio of output to input voltage directly proportional to said duty ratio, said harmonics being represented for said at least one phase as a sum of the phase voltage thereof and a portion of at least one harmonic of said phase voltage thereof, said duty ratio for the GTO devices connected to said at least one phase modulated inversely to the sum of the phase voltage thereof and the portion of the at least one harmonic of said phase voltage thereof, thereby eliminating the at least one harmonic of said at least one phase.

* * * * *